United States Patent
Benzie et al.

(10) Patent No.: US 6,512,461 B1
(45) Date of Patent: Jan. 28, 2003

(54) METHOD OF TEACHING TRANSMITTER CODES TO REMOTE RECEIVERS

(75) Inventors: Thomas Benzie, Canton, MI (US); Steven Settles, Sterling Heights, MI (US); Andrea Feldman, Farmington Hills, MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 08/721,606

(22) Filed: Sep. 26, 1996

(51) Int. Cl.[7] .............................................. H04B 10/24
(52) U.S. Cl. ........................... 340/825.22; 340/825.69; 701/29
(58) Field of Search ....................... 340/825.22, 825.31, 340/825.69, 825.72, 426; 307/10.2; 364/551.01; 701/35, 33, 29; 180/313

(56) References Cited

U.S. PATENT DOCUMENTS

| | | | | |
|---|---|---|---|---|
| 4,754,255 A | * | 6/1988 | Sanders et al. | 340/825.31 X |
| 5,049,867 A | * | 9/1991 | Stouffer | 340/426 |
| 5,107,428 A | * | 4/1992 | Bethencourt et al. | 701/35 |
| 5,278,547 A | * | 1/1994 | Suman et al. | 340/825.31 X |
| 5,600,324 A | * | 2/1997 | Reed et al. | 340/825.69 X |
| 5,635,900 A | * | 6/1997 | Hasegawa et al. | 340/825.72 X |
| 5,650,774 A | * | 7/1997 | Drori | 340/825.31 X |
| 5,654,688 A | * | 8/1997 | Allen et al. | 340/825.72 X |
| 5,689,353 A | * | 11/1997 | Darbee et al. | 340/825.72 X |
| 5,729,210 A | * | 3/1998 | Kiriyama | 340/825.72 |
| 5,767,784 A | * | 6/1998 | Khamharn | 340/825.31 |

FOREIGN PATENT DOCUMENTS

| | | |
|---|---|---|
| EP | 0642959 A1 | 8/1994 |
| EP | 0659966 A1 | 11/1994 |
| WO | WO9215761 | 9/1992 |

\* cited by examiner

Primary Examiner—Michael Horabik
(74) Attorney, Agent, or Firm—Brooks & Kushman P.C.

(57) ABSTRACT

An improved method for programming a vehicle remote entry receiver includes transmitting the information over the vehicle data bus line. A diagnostic box which is typically utilized to check the electrical systems on the vehicle is provided with a switch that moves the vehicle receiver into a programming mode. Information with regard to the transmitters that are to be associated with the vehicle receiver may then be transmitted over the bus line to the receiver. Alternatively, the receiver itself may capture the transmitter signals.

18 Claims, 1 Drawing Sheet

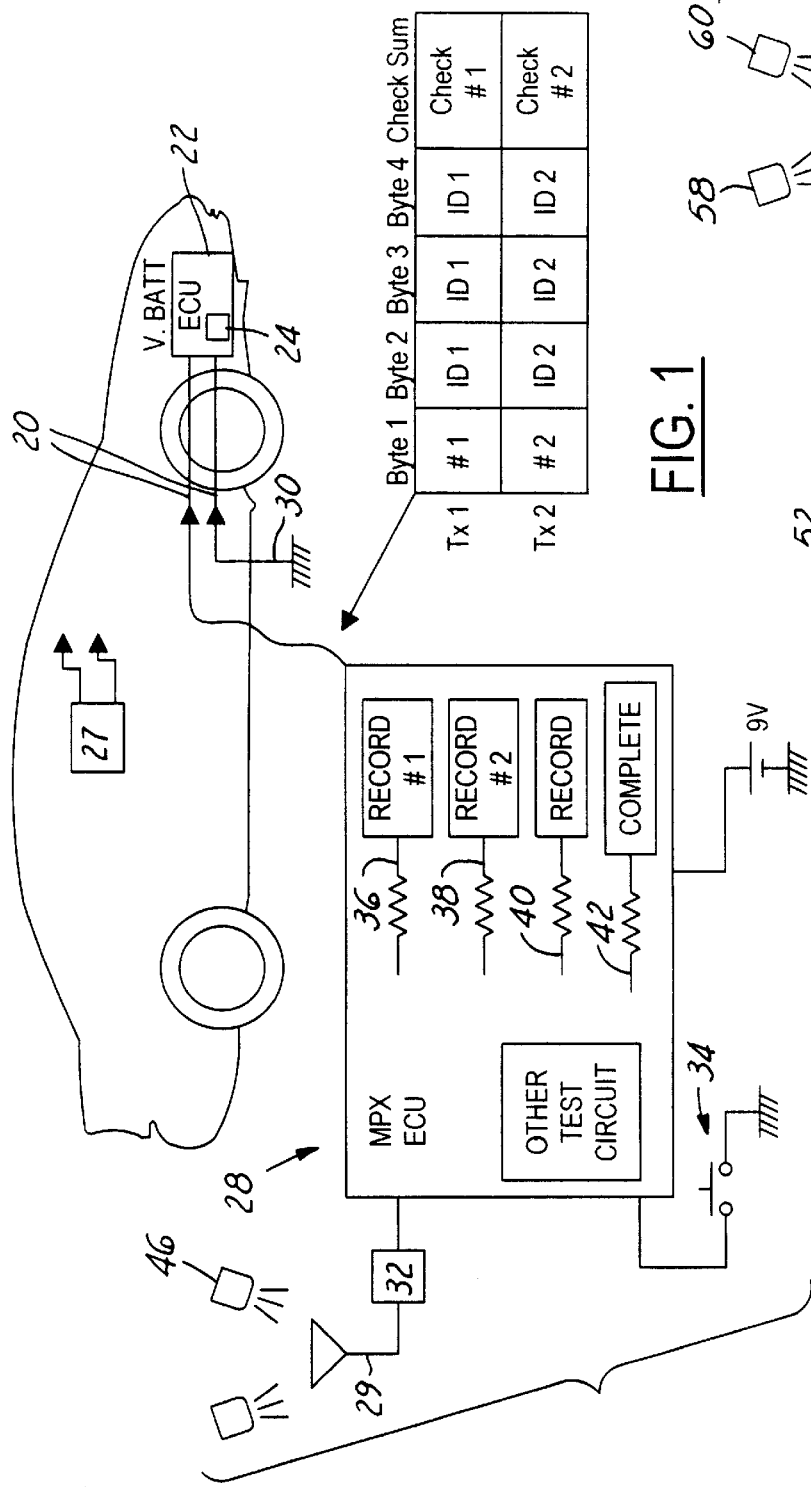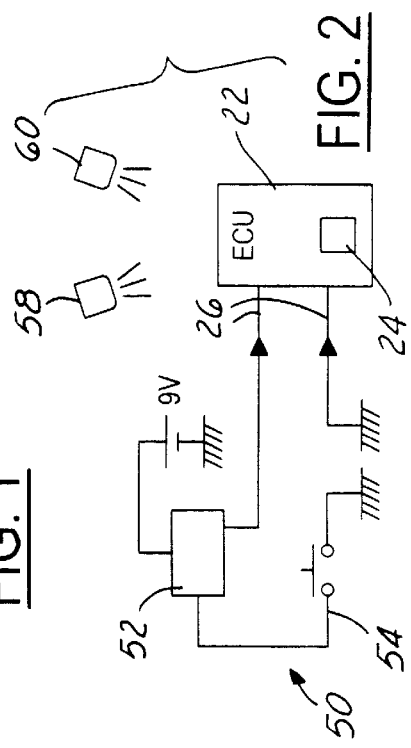

METHOD OF TEACHING TRANSMITTER CODES TO REMOTE RECEIVERS

BACKGROUND OF THE INVENTION

This invention relates to a unique method of teaching transmitter codes to a receiver, such as a remote vehicle door entry receiver, wherein the codes are transmitted to a receiver directly over the communication bus line in the vehicle.

Vehicle door remote entry systems are becoming increasingly popular. Originally, these systems utilized any one of a relatively small number of fixed identification (i.d.) codes. Thus, the receiver and transmitter could be quickly and easily taught corresponding codes in a bulk programming method where many receivers were taught the same transmitter. However, this fixed code system has some undesirable security features. When there are only a small number of available codes, then the possibility of a criminal entering a vehicle by using a like transmitter is greatly increased. For that reason it has become desirable to manufacture transmitters which contain ID codes that have been randomly generated, when used with such transmitters, the receiver must "learn" the actual ID codes so that it will know which transmitters belong to the system.

Each transmitter has the identification code, which is comprised of several bytes of information, programmed within its own software.

Presently, the known method of programming the receiver includes providing a series of complicated signals based on actuation of vehicle switches to tell the receiver to enter a programming mode. The receiver then receives and stores the signal from the transmitter. Once the receiver has completed the programming mode, it is able to recognize the dedicated transmitters that have been associated with the receiver.

One difficulty with this system is that the procedure for signalling the receiver to enter the programming mode is relatively complex. The signals cannot be simple, or the operator may accidentally move the receiver into the programming mode. Thus, it is typical that the manufacturer of the receiver and transmitter systems would perform the manipulation of the system, since it is complex, to put the receiver in the programming mode. The programmed security system is then transported to the vehicle manufacturer for assembly into a vehicle. In many cases, the receiver is incorporated into a junction block for the vehicle, which is provided by a second automotive supplier. Thus, the remote entry system receiver must first be programmed, then sent to the second supplier, and incorporated into the junction block. The assembled junction block is then transported to the vehicle supplier.

With this procedure, the particular transmitters must be maintained with the receiver. To this end, assemblers have typically bundled the transmitter with the receiver. As an example, the transmitters may be taped or otherwise attached to the receiver body during shipment. Once the receiver is associated with the vehicle, the transmitters are stored in the vehicle, often being placed in the glove compartment.

In the past, the transmitters have sometimes become misplaced. This presents a problem as the complex learning for the receiver must then be repeated. It is a desire of the final vehicle assembler to minimize any complications. The requirement of having to associate the transmitters with the receiver presents unwanted complications to the vehicle assembler.

SUMMARY OF THE INVENTION

In a disclosed embodiment of this invention, the signal to place the receiver in programming mode is sent through a communication bus line associated with the vehicle system, after the receiver has been mounted onto the vehicle. A simple switching procedure is utilized to place the receiver in its programming mode, and the receiver is then taught the codes for the particular transmitters. With this method, the receivers need not be bundled with the transmitter until after the final vehicle assembly. Instead, transmitters may be selected at a late assembly line location and then programmed into the receiver. This reduces complications for the vehicle assembler.

In one preferred embodiment, the diagnostic box, which is typically connected to the bus line to perform a final quality check of vehicle electrical systems, is utilized to send the receiver the signal to move into programming mode. The diagnostic box is preferably modified to include a start or program button that sends the signal. The diagnostic box is provided with a harness that is connected to the computer bus line. When testing is complete the box is disconnected and the vehicle component wire harness is attached to the bus line.

In a preferred embodiment, the diagnostic box is also provided with its own receiver. The operator transmits a signal from a first transmitter to the diagnostic box receiver where it is captured and stored. Subsequent transmitter signals are also captured and stored at the diagnostic box receiver. Once all required signals have been captured, the diagnostic box sends the code over the communication bus line to the receiver. The diagnostic box is preferably provided with a series of prompt lights to assist the operator in performing these required steps in the proper sequence.

With the diagnostic box based receiver, noise may be de-tuned from other machines on the assembly line, and from adjacent assembly lines, where programming of other receivers may be taking place. In one embodiment, the antenna associated with the receiver on the diagnostic box is made to only accept a signal from very close range. As an example, that antenna could be designed such that it would only accept a signal within a range of three feet. In this way, noise from adjacent machinery or assembly lines would not effect the transmission or reception of the signal. The same limited range may not be practical for the vehicle based receiver that is to receive the signal from the driver, and thus typically needs to function at a longer range.

In a second embodiment, the diagnostic box does not include the receiver nor the prompt lights. Instead, the diagnostic box is provided only with the switch to initiate a programming signal. The operator actuates the switch and a signal is sent over the bus line to tell the receiver to enter a programming mode. The operator then transmits the codes directly to the vehicle mounted receiver in the ECU which captures and records the codes.

Once programming is complete the diagnostic harness is disconnected.

In addition, a junction box which may include the ECU for the vehicle communicates with the communication bus line to send and receive electrical signals to components and systems on the vehicle. The receiver for the remote vehicle door entry systems is incorporated into this junction box, and communicates with the bus line. The receiver is operable to receive a signal to enter a programming mode over the bus line.

These and other features of the present invention can be best understood from the following specification and drawings, of which the following is a brief description.

BRIEF DESCRIPTION OF THE DRAWINGS

FIG. 1 is a schematic view of a first embodiment of this invention.

FIG. 2 is a schematic view of a second embodiment of this invention.

DETAILED DESCRIPTION OF A PREFERRED EMBODIMENT

A system 20 is disclosed in FIG. 1 including a vehicle junction box 22 of electronic control unit which includes a vehicle door remote entry receiver 24. Receiver 24 may be as known in the industry, and is operable to receive a transmitter signal to determine whether the signal is acceptable and open or lock the vehicle doors in response to an acceptable signal.

ECU 22 is provided with operational signals through a communication serial bus line 26. When the vehicle is fully assembled, communication bus line 26 is attached to wire harnesses 27, shown schematically, that send and receive signals from components and systems on the vehicle. As is known ECU 22 monitors and controls the several components and systems through the bus line. The receiver 24 is unique over the prior art in that it does communicate with the bus line 26, and is operable to receive a signal from the bus line 26 to enter a programming mode. This feature will be explained fully below.

It is known to use communication bus line 26 in combination with a diagnostic box to check electrical systems prior to final release of the vehicle. The present invention modifies diagnostic box 28 such that it assists in the programming of the receiver 24. Diagnostic box 28 is shown having a line 30 which is selectively attached to the bus line 26 through a plug-in harness assembly. The diagnostic box 28 also preferably includes circuitry for testing other vehicle electrical systems. This portion of the diagnostic box is as known in the art, and forms no portion of this invention.

Diagnostic box 28 has been modified to include an antenna 29 including a RF receiver 32, and a switch 34. Prompt signal lines 36, 38, 40 and 42 may also be associated with box 28. The lines 36, 38, 40 and 42 may include display lights on the face of the diagnostic box 28.

Transmitters 44 and 46 are to be programmed such that each signal is recorded in the receiver 24. Transmitters 44 and 46 are preferably of the known type which include the identification codes that are individual for each transmitter.

To accomplish programming with the inventive method, the diagnostic box harness 30 is first connected to bus line 26. The operator actuates switch 34 and diagnostic box 28 enters a programming mode. The first prompt line 36 prompts the operator to record the first transmitter. Transmitter 44 is then pointed at antenna 29, and a signal is transmitted and captured by receiver 32. Once the signal is properly received, the diagnostic box then actuates prompt line 38. Prompt 38 prompts the operator to record the second transmitter 46. The operator then points the transmitter 46 at antenna 29 and that signal is recorded. If the second signal is identical to the first, the system will determine that the operator has re-recorded the first transmitter, and the prompt 38 will continue to be lit signalling the operator to use another transmitter.

Antenna 29 and receiver 32 may be detuned to only accept signals from a very short range, say less than 10 feet, or even less than 3 feet. In this way the system is not affected by noise in the vicinity of box 28.

Prompt 40 is actuated once the second signal has been captured, indicating the system is programming. Once programming is complete, a programming complete light 42 is actuated. During programming, the signals are sent to receiver 24 over the bus line 26. The box shown in FIG. 1 graphically sketches the components of the signal sent to receiver 24. A first byte includes an identifier that the first transmitter code is now being transmitted. The next three bytes include the I.D. code for the first transmitter. Finally, a checksum byte for this first transmission signal is included, for a total of five bytes. As is known, a checksum provides information to a receiver about whether the combined digital signal should be an odd or even number. This provides the receiver with the ability to check the accuracy of the received signal.

Once the first signal is received, the second transmitter signal then follows. The second transmitter signal is similar to the first. Once the second transmitter signal has been received, a signal is sent from receiver 24 to the diagnostic box 28 indicating that programming has been successfully completed. Prompt 42 is then lit. The operator may then disconnect harness 30 from bus line 26. Of course, other testing may continue with box 28. Also, box 28 may be constructed solely to perform programming.

A second embodiment 50 is illustrated in FIG. 2. Diagnostic box 52 is still provided with a switch 54 to begin the programming mode at receiver 24. In this embodiment, only the single signal telling the receiver 24 to enter program mode is transmitted by box 52. The receiver 24 then enters the program mode. The operator then points the key fob transmitters 58 and 60 at the vehicle and transmits the signals. The receiver 24 records the signals and is then programmed. Of course, prompt lights could also be provided with this embodiment. In such a case the successful capture of a signal would be sent to box 52 from receiver 24.

The present invention simplifies the programming of the receivers for vehicle door remote entry systems. By utilizing the communications bus, a more secure, and less difficult programming of the receiver is achieved. The specific electronics necessary to achieve the goals of these inventions are well within the skill of a worker in the art. While preferred embodiments of this invention have been disclosed, a worker of ordinary skill in the art would recognize certain modifications would come within the scope of this invention. For that reason the following claims should be studied to determine the true scope and content of this invention.

What is claimed is:

1. A method of programming a receiver for a remote entry system comprising the steps of:

(1) providing a plurality of transmitters each having an individual signal, providing a receiver while said receiver is still in said programming mode; and communicating with a communication data bus line communicating with a remote entry system, providing a diagnostic system to be selectively communicated with said bus line, said diagnostic system being provided with a switch to initiate programming mode at the receiver;

(2) connecting said diagnostic system to said bus line;

(3) actuating said switch on said diagnostic system to move said receiver into a programming mode;

(4) transmitting signals from said transmitters to be recorded to said vehicle receiver; and (5) disconnecting said diagnostic system from said bus line.

2. A method as set forth in claim 1, wherein said remote entry system is a vehicle remote entry system and said data bus line being a communication data bus line for a vehicle.

3. A method as recited in claim 2, wherein said diagnostic system is provided with a box receiver and said transmitters transmit said signals to said box receiver, said diagnostic system then transmitting said received signals over said bus line to said vehicle receiver.

4. A method as recited in claim 3, wherein said diagnostic system transmits a signal over said bus line including a lead identifier identifying which of said transmitter signals is following said lead identifier.

5. A method as recited in claim 2, wherein said diagnostic system includes prompts to tell an operator when to record each of said plurality of transmitters at said box receiver.

6. A method as recited in claim 2, wherein said vehicle receiver receives signals directly from said transmitters and stores said received signals.

7. A method as recited in claim 6, wherein said diagnostic system sends a signal over said bus line to said vehicle receiver telling said vehicle receiver to enter a programming mode prior to said transmitters transmitting said signals to said vehicle receiver.

8. A method of programming a vehicle receiver for a remote entry system comprising the steps of:
   (1) providing a vehicle receiver on a vehicle, providing a bus line communicating with said vehicle receiver;
   (2) providing a signal over said bus line to said vehicle receiver telling said receiver to enter a programming mode; and
   (3) transmitting a signal from a transmitter to said receiver such that said receiver is able to be programmed to an individual transmitter.

9. A method as recited in claim 8, wherein a diagnostic system includes a switch to begin actuation of said signal of step (2), said diagnostic system being selectively connected to said bus line to transmit said signal.

10. A method as recited in claim 9, wherein said diagnostic system is provided with a box receiver, said box receiver receiving said transmitter signals, and said transmitter signals then being transmitted over said bus line to said vehicle receiver.

11. A method as recited in claim 8, wherein said diagnostic system is provided with prompts, said prompts telling an operator which steps to take sequentially when programming said vehicle receiver.

12. A method as recited in claim 11, wherein a plurality of transmitters are programmed into said vehicle receiver.

13. A method as recited in claim 12, wherein said vehicle receiver is incorporated into the junction block for the vehicle, and said vehicle receiver captures and records said transmission signals after having received said signal from said diagnostic system.

14. An electronic system for programming a vehicle electrical system comprising:
   (1) a programming system including outlet lines which may be selectively connected into a bus line of a vehicle; and
   (2) a switch operable to begin a programming mode for a remote entry system mounted on a vehicle to be programmed by said programming system, said switch causing a signal to be sent over said bus line to a vehicle receiver to tell the vehicle receiver to enter a programming mode.

15. A diagnostic system as recited in claim 14, wherein said programming system further communicates with an antenna and a box receiver such that said antenna may capture signals from remote entry transmitters, and said box receiver may then store the signal, which may then be transmitted over said bus line to the vehicle receiver.

16. A diagnostic box as recited in claim 14, wherein said programming system is also provided with prompt lights to provide indications to an operator of proper sequential steps.

17. A receiver as recited in claim 17, wherein said line is a communication bus line.

18. A receiver for a remote entry system comprising:
   a receiver body adapted to receive signals from a transmitter, and compare transmitter signals to expected signals from the transmitter based upon a transmitter code, said receiver being operable to enter a programming mode where it can be programmed with the code for an associated transmitter; and
   said receiver, communicating with a remote entry system, said receiver being operable to receive a signal over a communication line to enter a programming mode, information relative to a transmitter which is to be associated with said receiver also being passed over said communication line to said receiver while said receiver is in said programming mode such that a direct connection is provided to supply the information to said receiver over said communication line.

* * * * *

UNITED STATES PATENT AND TRADEMARK OFFICE
CERTIFICATE OF CORRECTION

PATENT NO.    : 6,512,461 B1
DATED         : January 28, 2003
INVENTOR(S)   : Thomas Benzie et al.

It is certified that error appears in the above-identified patent and that said Letters Patent is hereby corrected as shown below:

<u>Title page,</u>
Item [*] Notice, the reference to the patent term extension should read as follows:

-- [*] Notice:   Subject to any disclaimer, the term of this patent is extended or adjusted under 35 U.S.C. § 154(b) by 1027 days. --

Signed and Sealed this

Ninth Day of September, 2003

JAMES E. ROGAN
*Director of the United States Patent and Trademark Office*